United States Patent [19]
Bacon et al.

[11] Patent Number: 6,027,062
[45] Date of Patent: Feb. 22, 2000

[54] OPTICAL FIBER DUAL SPINDLE WINDER WITH AUTOMATIC THREADING AND WINDING

[75] Inventors: Christopher John Bacon, Hampstead; Kirk Patton Bumgarner, Wilmington, both of N.C.; Paul Andrew Chludzinski, Berlin, Mass.; Duane Edward Hoke, Wilmington, N.C.; Ronald Lee Kimball, Corning, N.Y.; Kenneth William Roberts, Wilmington, N.C.

[73] Assignee: Corning Incorporated, Corning, N.Y.

[21] Appl. No.: 09/042,489

[22] Filed: Mar. 16, 1998

Related U.S. Application Data
[60] Provisional application No. 60/041,371, Mar. 25, 1997.

[51] Int. Cl.[7] .................... B65H 67/044; B65H 57/00; B65H 59/14
[52] U.S. Cl. ........................ 242/474.7; 242/157.1; 242/419.7; 242/476.6; 242/483.5; 242/920
[58] Field of Search ................... 242/920, 470, 242/474.4, 474.7, 483.3, 483.5, 473.7, 473.8, 476.6, 157.1, 476.1, 397.3; 226/92, 11; 65/479, 539

[56] References Cited

U.S. PATENT DOCUMENTS

| | | | |
|---|---|---|---|
| 2,453,184 | 11/1948 | Berry | 242/157.1 |
| 3,152,769 | 10/1964 | Dzugan | 242/483.3 |
| 3,589,642 | 6/1971 | Blagg | 242/157.1 |
| 3,938,749 | 2/1976 | Gleyze | 242/473.8 |
| 3,980,244 | 9/1976 | Pietroni . | |
| 4,138,069 | 2/1979 | Bonzo et al. . | |
| 4,206,883 | 6/1980 | Isoard . | |
| 4,223,848 | 9/1980 | Brokke et al. . | |
| 4,232,838 | 11/1980 | Bravin | 242/157.1 X |
| 4,342,430 | 8/1982 | Kasai et al. . | |
| 4,477,033 | 10/1984 | Kotzur et al. . | |
| 4,618,104 | 10/1986 | Harris . | |
| 4,637,564 | 1/1987 | Hallenbeck et al. | 242/470 X |
| 4,643,368 | 2/1987 | Hattersley, Jr. . | |
| 4,752,043 | 6/1988 | Heinzer . | |
| 4,792,100 | 12/1988 | Pepe . | |
| 4,798,346 | 1/1989 | Myers et al. . | |
| 4,848,687 | 7/1989 | Myers et al. . | |
| 4,948,058 | 8/1990 | Behrens et al. . | |
| 4,969,607 | 11/1990 | Busenhart et al. . | |
| 4,979,687 | 12/1990 | Birch . | |
| 5,102,060 | 4/1992 | Busenhart . | |
| 5,156,347 | 10/1992 | Gay, II et al. . | |
| 5,219,125 | 6/1993 | Rigg . | |
| 5,246,178 | 9/1993 | Badiali et al. | 242/476.6 |
| 5,251,834 | 10/1993 | Ikegami et al. . | |
| 5,322,228 | 6/1994 | Nagayama et al. . | |
| 5,426,929 | 6/1995 | Schwalm et al. | 242/473.8 X |
| 5,472,128 | 12/1995 | Nagayama et al. . | |
| 5,542,592 | 8/1996 | Hoffa et al. | 226/44 |
| 5,549,254 | 8/1996 | Menegatto | 242/476.1 |
| 5,558,296 | 9/1996 | Sasaki et al. . | |

FOREIGN PATENT DOCUMENTS

| | | |
|---|---|---|
| 2-286573 | 11/1990 | Japan . |
| 4-159975 | 6/1992 | Japan . |

*Primary Examiner*—Michael R. Mansen
*Attorney, Agent, or Firm*—Robert L. Carlson

[57] ABSTRACT

An apparatus for threading a fiber that is being continuously supplied by a supplying device for winding on a spool, includes a collecting device, adjacent to the supplying device, that collects the fiber by urging the fiber from the supplying device into the collecting device to provide a tension in the fiber between the supplying device and the collecting device, a positioning device that engages the fiber, between the supplying device and the collecting device, with an engaging portion that allows the fiber to be continuously collected in the collecting device and that moves from a position adjacent to the supplying device and the collecting device to a position adjacent to the spool to move the fiber to at least one threading position, and a threading device that automatically threads the fiber at the at least one threading position onto the spool.

33 Claims, 12 Drawing Sheets

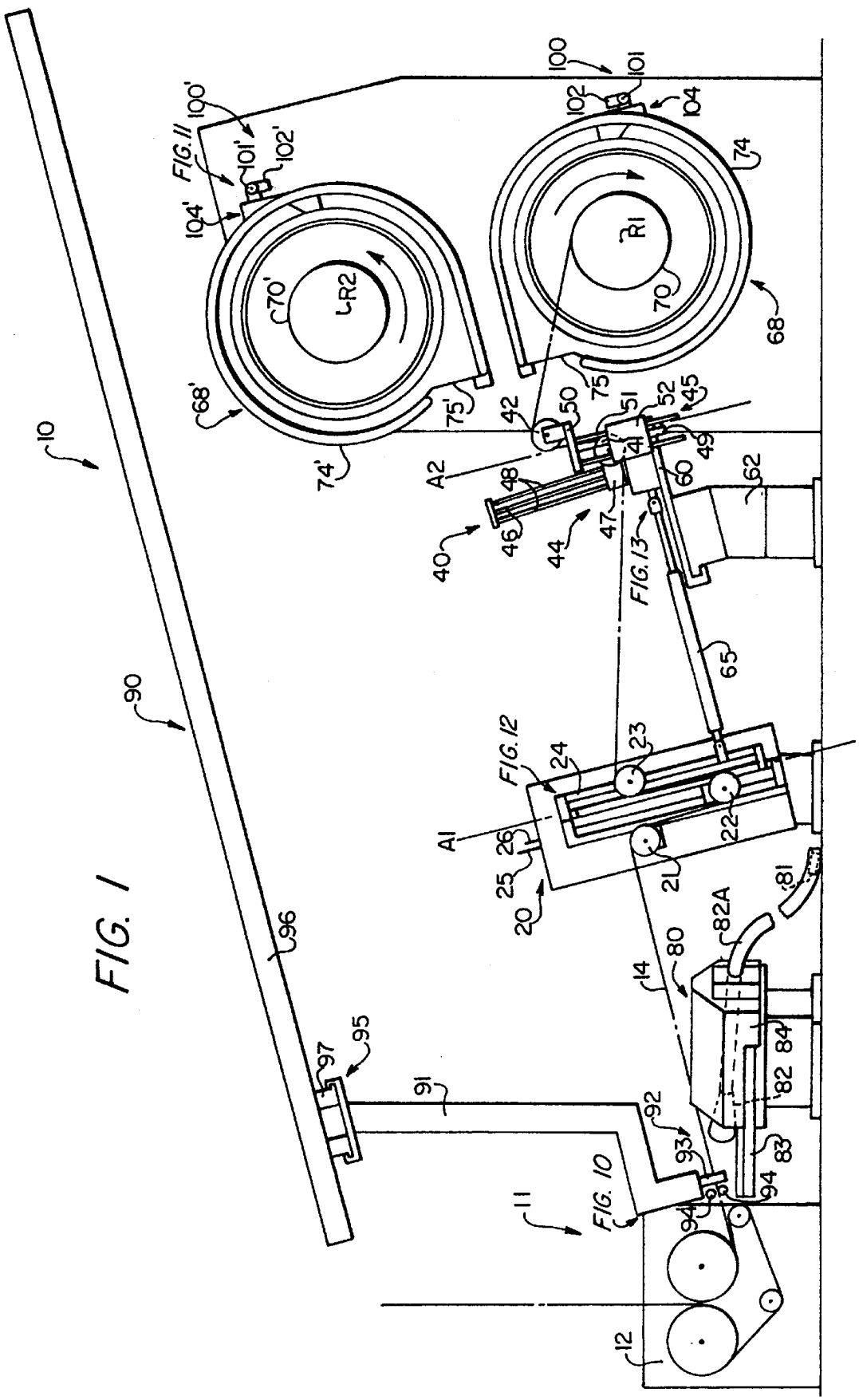

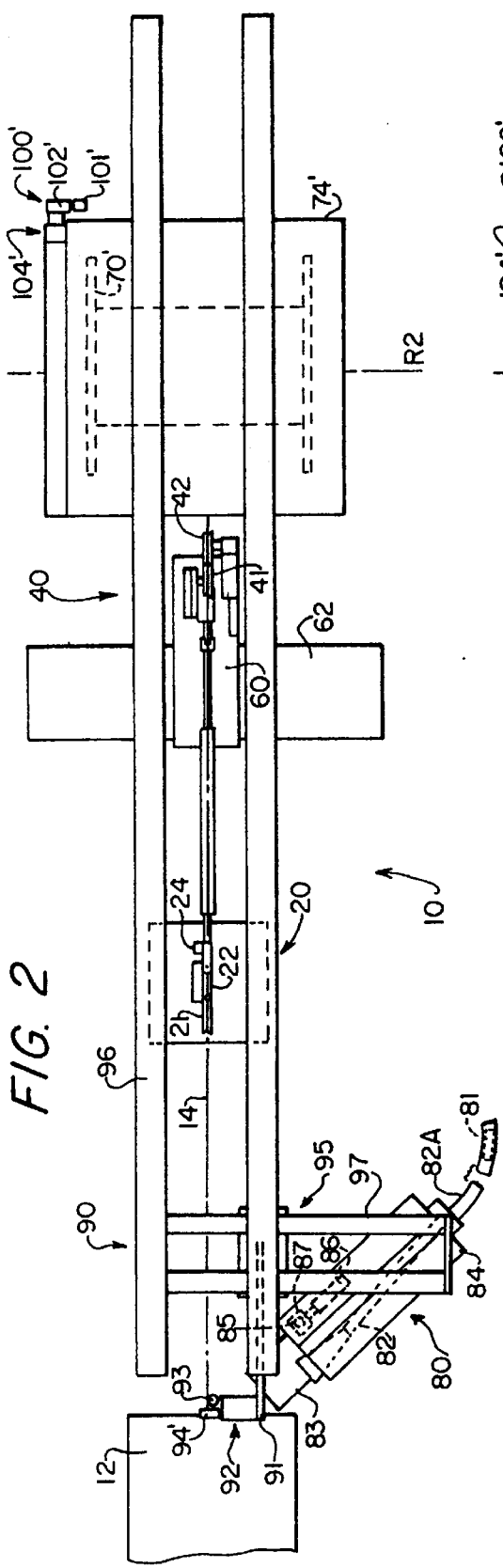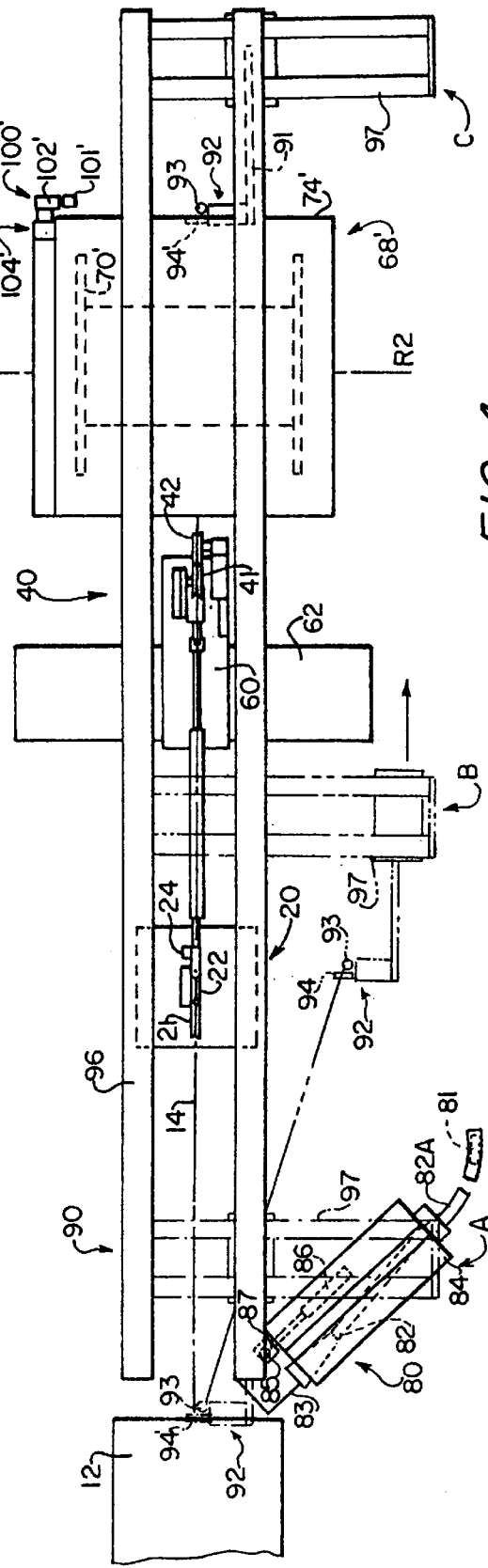

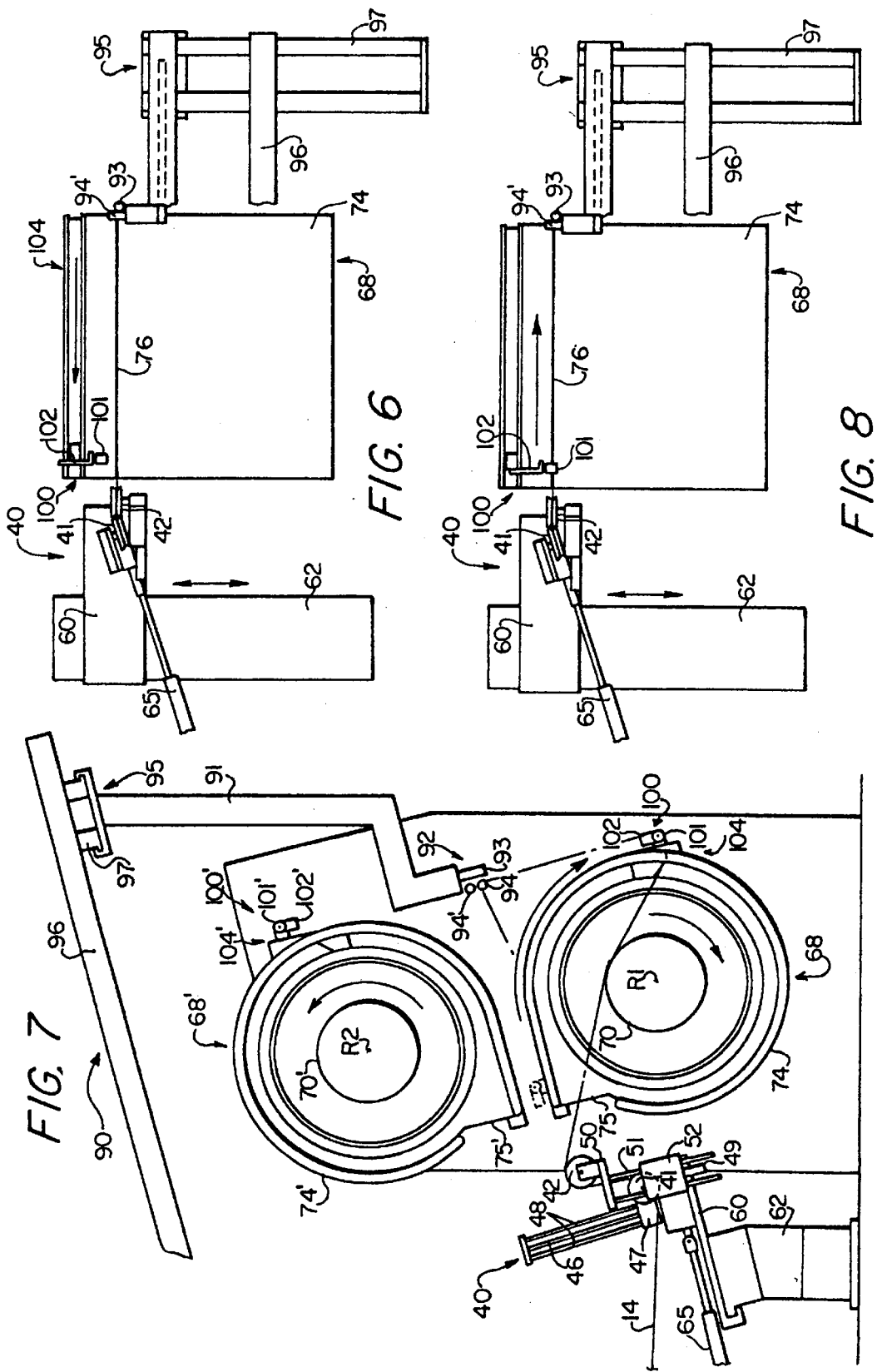

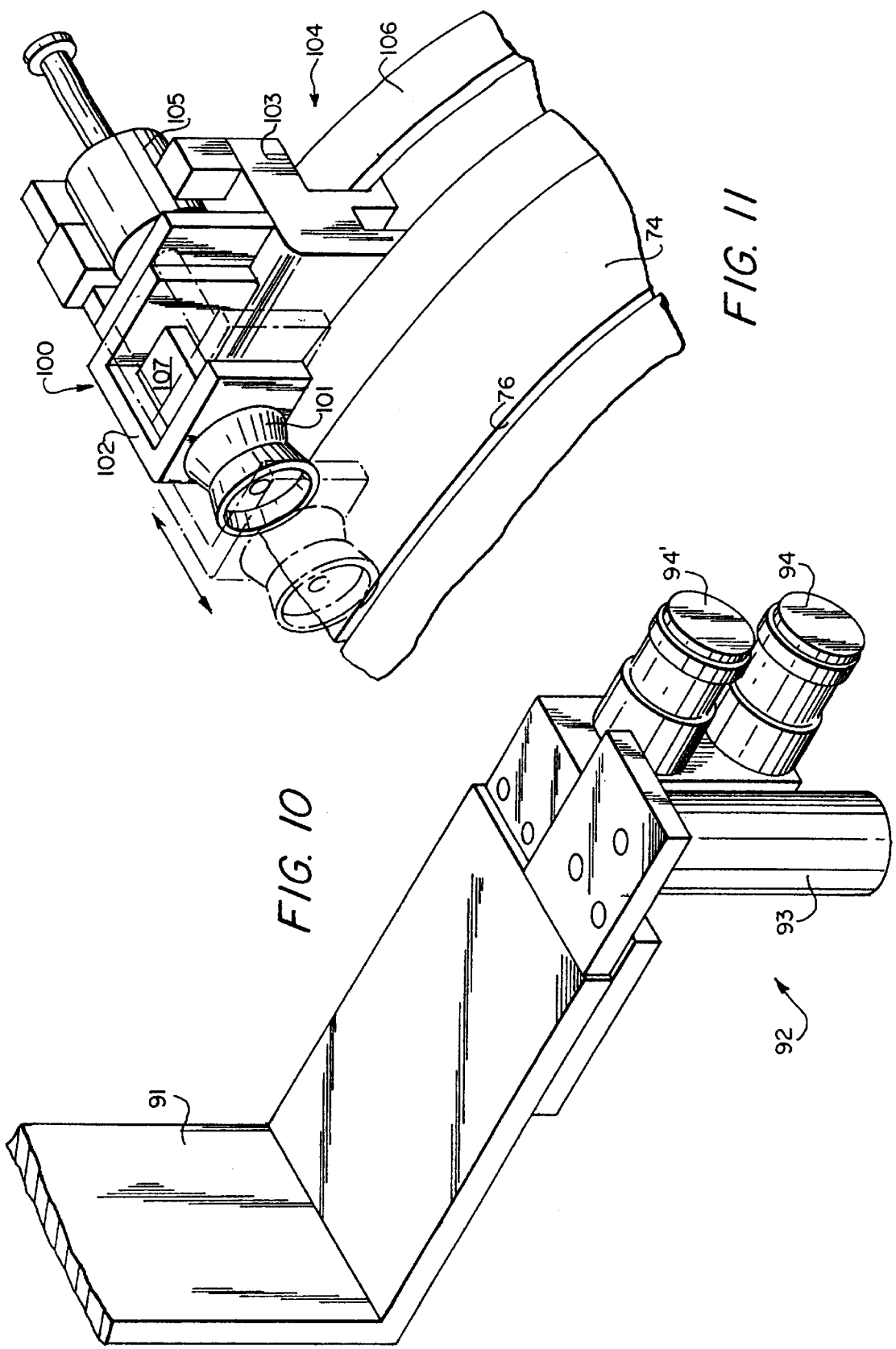

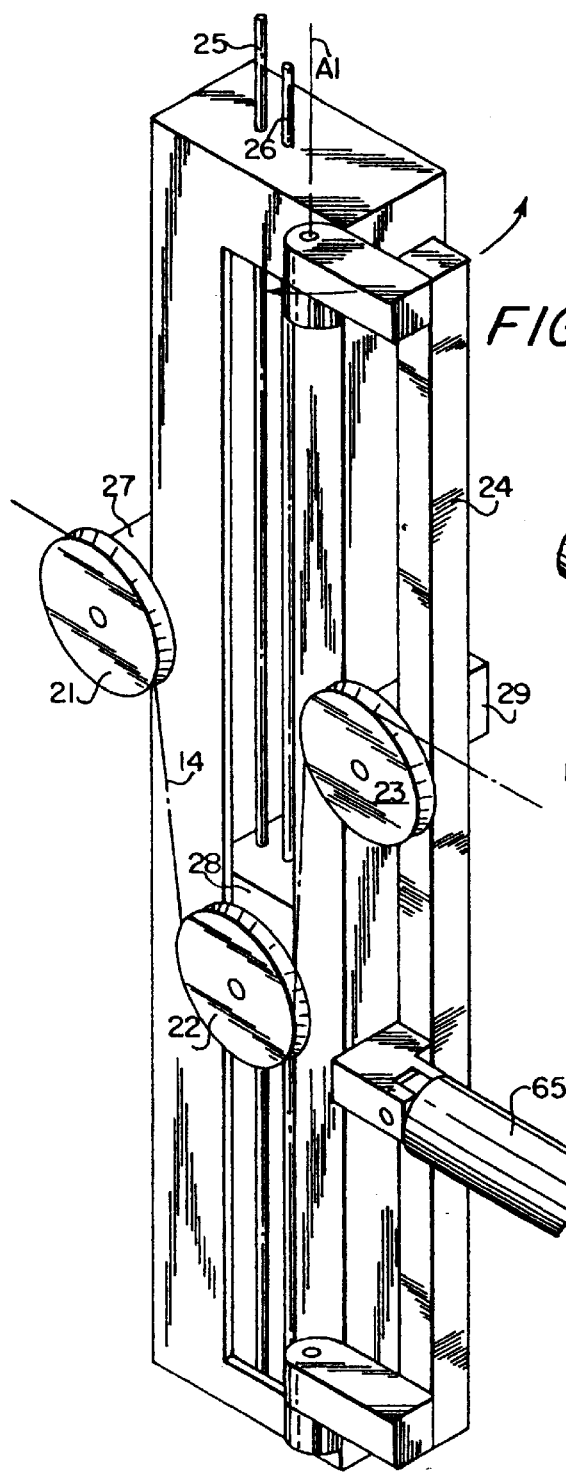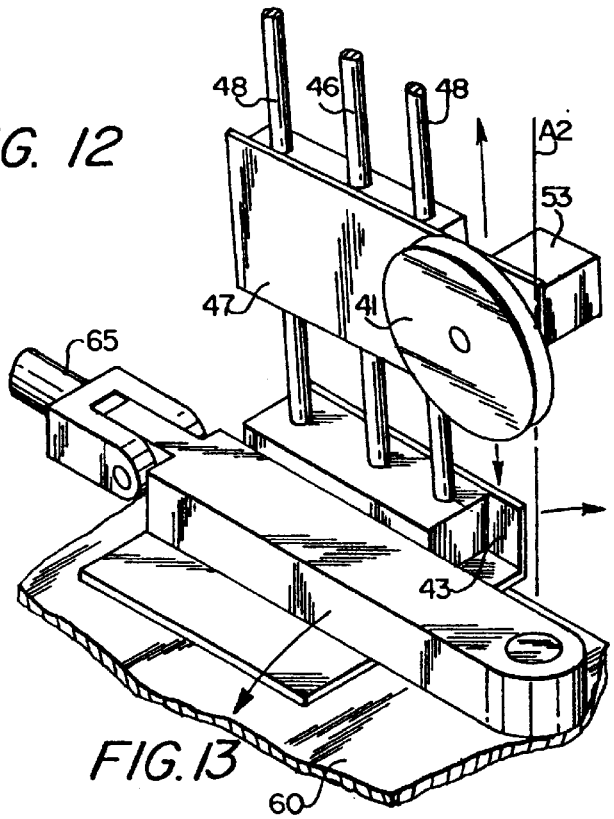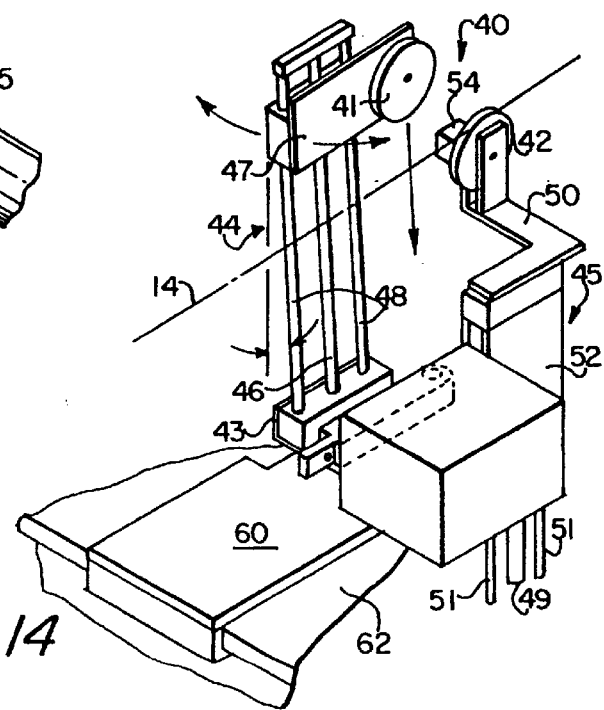

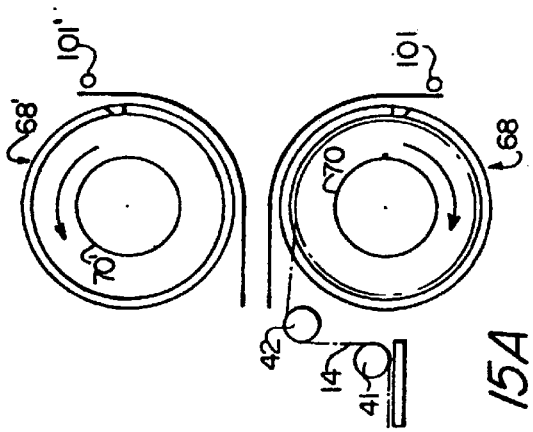
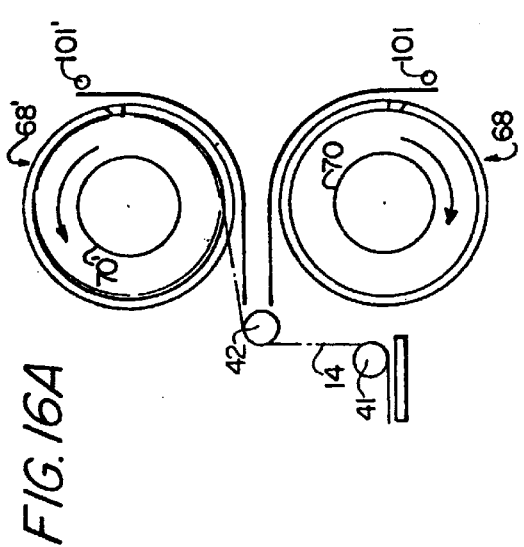
FIG. 15A  FIG. 16A
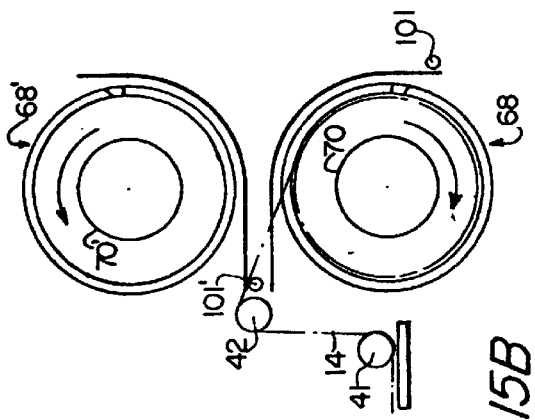
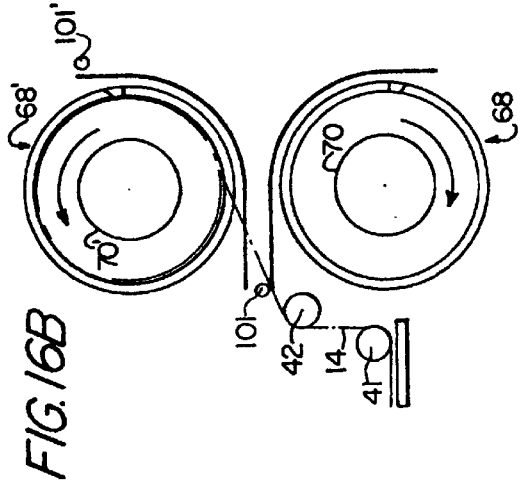
FIG. 15B  FIG. 16B
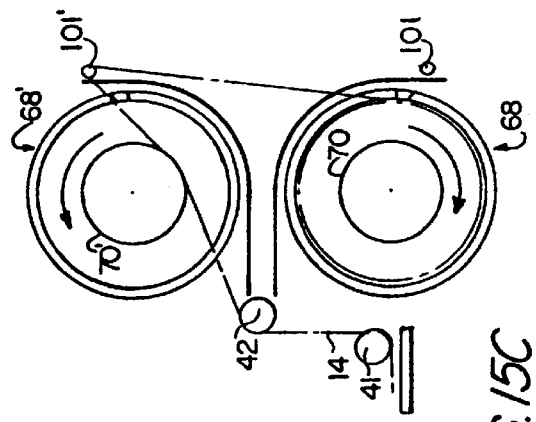
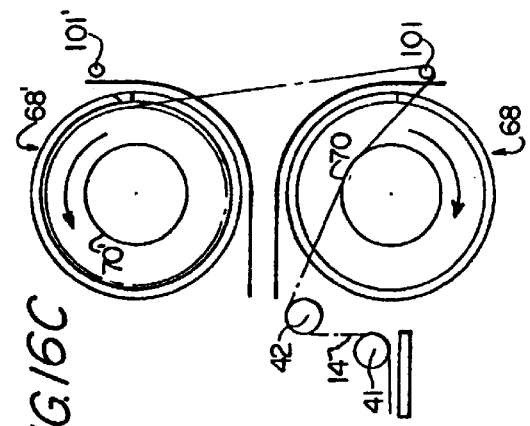
FIG. 15C  FIG. 16C

OPTICAL FIBER DUAL SPINDLE WINDER WITH AUTOMATIC THREADING AND WINDING

BACKGROUND OF THE INVENTION

This application claims benefit of Provisional application Ser. No. 60/041,371, filed Mar. 25, 1997.

Field of the Invention

The present invention relates to a method and apparatus for automatically threading and winding a fiber on a spool and, more particularly, to a method and apparatus for automatically threading and winding an optical waveguide fiber on a spool as the optical waveguide fiber is being drawn.

Description of the Related Art

Optical waveguide fibers (optical fibers) are a transmission medium used in optical communication systems. Optical fibers are typically made by known methods that involve drawing the optical fibers from blanks in draw furnaces. Winding apparatus wind the optical fibers on spools as the optical fibers are being drawn.

Conventional winding apparatus require an undesirable amount of manual intervention by an operator. For example, if an optical fiber breaks during winding, known single-spindle and multi-spindle winding apparatus require manual rethreading of the winding apparatus by the operator.

Also, since draw furnaces typically continue to produce optical fiber regardless of whether the winding apparatus is winding the optical fiber, a significant amount of optical fiber will be lost if the winding apparatus is not rethreaded quickly after a break or after a spool becomes full. The possibility of a delay in rethreading is a disadvantage of both single-spindle and multi-spindle winding apparatus. It is a particularly significant problem for single-spindle winding apparatus, however, because rethreading is always delayed at least until the operator removes the wound spool from the spindle and replaces it with an empty spool.

These disadvantages of known winding apparatus have become even more pronounced with advances in technology that have made it possible to increase the drawing speed from seven meters per second to more than thirty meters per second. Delays in rethreading cause even more fiber loss at higher drawing speeds.

Also, the higher drawing speeds have caused new problems to develop. Conventional winding apparatus, which were designed for low drawing speeds, may damage the optical fiber moving at high speeds.

SUMMARY OF THE INVENTION

An object of the present invention is to provide an automated winding method and apparatus.

Another object of the present invention is to provide a winding method and apparatus that rethread quickly to minimize the amount of lost optical fiber.

Yet another object of the invention is to provide a winding method and apparatus that will not damage optical fiber moving at high speeds.

Additional objects and advantages of the invention will be set forth in part in the description which follows, and in part will be obvious from the description, or may be learned by practice of the invention.

To achieve the objects and in accordance with the purpose of the invention, as broadly described herein, the invention provides an improved method of positioning, for threading, a broken fiber, which is being continuously supplied by a supplying device for winding on a spool. The method comprises the steps of collecting the fiber with a collecting device by urging the fiber from the supplying device into the collecting device to provide a tension in the fiber between the supplying device and the collecting device, the collecting device being located at a position that ensures that the collecting device will automatically collect the fiber from the supplying device after the fiber breaks, engaging the fiber between the supplying device and the collecting device with a positioning device having an engaging portion that engages the fiber while allowing the fiber to be continuously collected in the collecting device, and moving the engaging portion to move the fiber to at least one threading position.

The invention also provides an improved apparatus for positioning, for threading, a broken fiber, which is being continuously supplied by a supplying device for winding on a spool. The apparatus comprises a collecting device that collects the fiber by urging the fiber from the supplying device into the collecting device to provide a tension in the fiber between the supplying device and the collecting device, the collecting device being located at a position that ensures that the collecting device will automatically collect the fiber from the supplying device after the fiber breaks, and a positioning device that engages the fiber, between the supplying device and the collecting device, with an engaging portion that allows the fiber to be continuously collected in the collecting device and that moves to move the fiber to at least one threading position.

It is to be understood that both the foregoing summary and the following detailed description are exemplary and explanatory only and are not restrictive of the invention, as claimed.

The accompanying drawings, which are incorporated in and constitute a part of this specification, illustrate an embodiment of the invention and together with the description, serve to explain the principles of the invention.

BRIEF DESCRIPTION OF THE DRAWINGS

FIG. 1 is a side view of a preferred embodiment of a winding apparatus according to the present invention, showing an optical fiber being wound on a first spool.

FIG. 2 is a plan view of the winding apparatus of FIG. 1.

FIG. 4 is a plan view of the winding apparatus of FIG. 1, showing the optical fiber being moved to the first threading position.

FIG. 6 is a plan view of a portion of the winding apparatus taken along line 6—6 in FIG. 5, showing the optical fiber in the second threading position.

FIG. 7 is a side view of a portion of the winding apparatus of FIG. 1, showing the optical fiber being threaded on the first spool.

FIG. 8 is a plan view of a portion of the winding apparatus of FIG. 1, showing the movement of a fiber guiding device.

FIG. 10 is a perspective view of an engaging portion of a positioning device of the winding apparatus of FIG. 1.

FIG. 11 is a perspective view of the fiber guiding device of the winding apparatus of FIG. 1.

FIG. 12 is a perspective view of the tensioning device of the winding apparatus of FIG. 1.

FIG. 13 is a perspective view of a portion of the distributor of the winding apparatus of FIG. 1.

FIG. 14 is a perspective view of the distributor of the winding apparatus of FIG. 1.

FIGS. 15A–15C are schematic side views showing the transfer of the optical fiber from the first spool to a second spool in the winding apparatus of FIG. 1.

FIGS. 16A–16C are schematic side views showing the transfer of the optical fiber from the second spool to the first spool in the winding apparatus of FIG. 1.

DESCRIPTION OF THE PREFERRED EMBODIMENT

Figure 3:
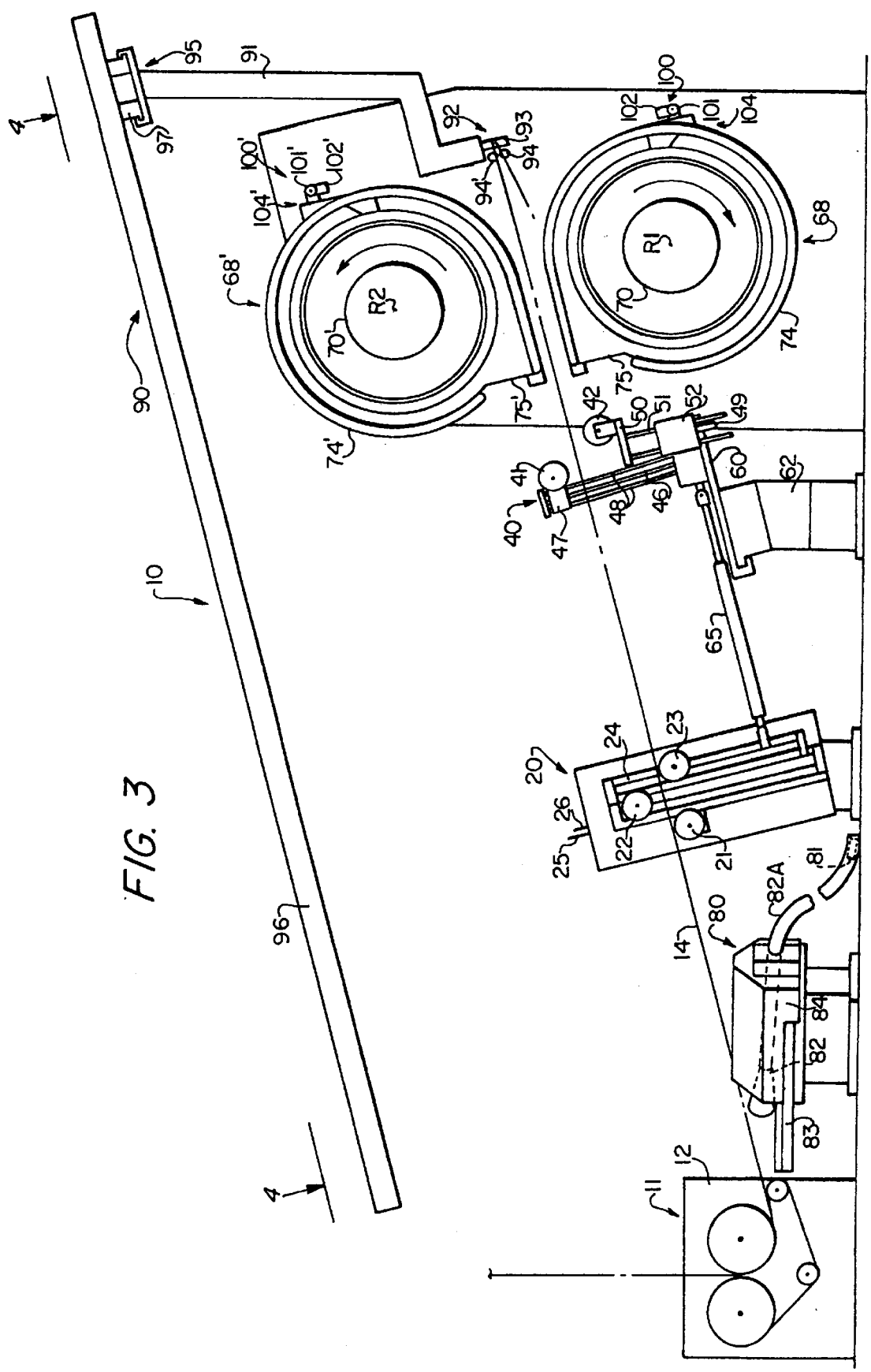
FIG. 3 is a side view of the winding apparatus of FIG. 1, showing the optical fiber in a first threading position.

Reference will now be made in detail to the presently preferred embodiment of the invention, an example of which is illustrated in the accompanying drawings. Wherever possible, the same reference numbers will be used throughout the drawings to refer to the same or like parts.

A preferred winding apparatus 10 winds an optical fiber 14 that is continuously supplied by a supplying device 11, namely, a draw furnace (not shown) and a belted capstan 12 that pulls the optical fiber from a blank in the draw furnace. The belted capstan 12 can be controlled by known means to control the speed at which the optical fiber is produced. Preferably, the optical fiber is produced at speeds greater than thirty meters per second.

The winding apparatus 10 includes components that are primarily used to wind the optical fiber, such as a tensioning and take-up speed control device 20 (hereinafter "tensioning device"), a distributor 40, and first and second spindle assemblies 68 and 68' that rotate first and second spools 70 and 70', respectively. The apparatus also includes components that are primarily used to thread the optical fiber, such as a collecting device 80, a positioning device 90, and first and second fiber guiding devices 100 and 100'. Of course, many of the winding components cooperate with the threading components during threading.

The Winding Components

Figure 9:
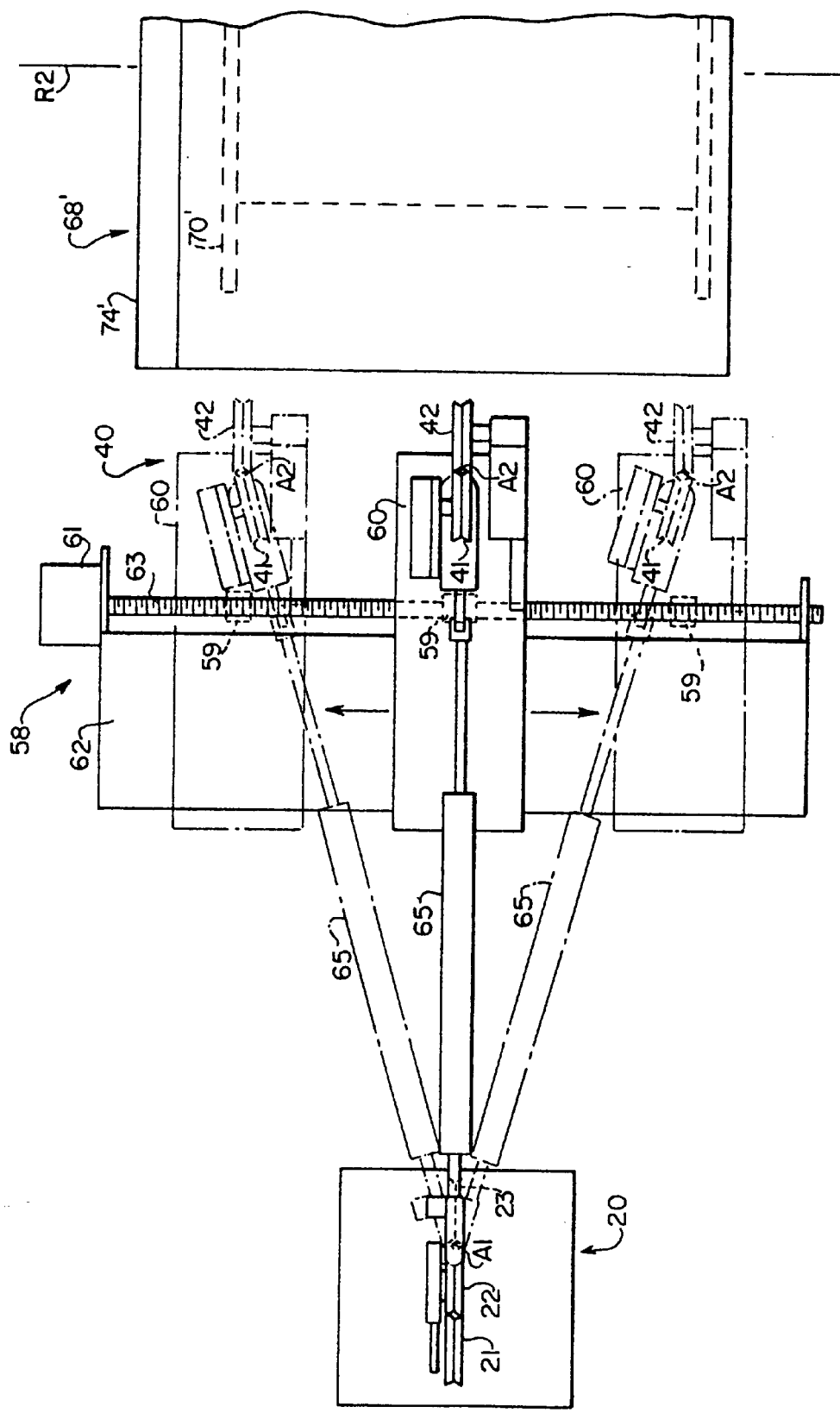
FIG. 9 is a plan view of a portion of the winding apparatus of FIG. 1, showing the cooperation between a tensioning device and a distributor.

The tensioning device 20 tensions the optical fiber during winding and determines the difference between the speed at which the optical fiber is being supplied by the supplying device 11 and the speed at which the optical fiber is being wound on a spool. As shown in FIG. 1, the tensioning device 20 includes, in order along the fiber path, first, second, and third guiding members (preferably pulleys) 21, 22, and 23 that guide the optical fiber. The third pulley 23 is mounted on a pivot member 24, which is connected to a frame of the tensioning device 20 so as to allow the third pulley 23 to pivot about an axis A1 (FIGS. 9 and 12). The second pulley 22 is non-pivotable, but, when it is in the winding position shown in FIG. 1, it is freely movable in a substantially vertical direction relative to the first and third pulleys 21 and 23. The freely-movable second pulley 22 is forced downward by gravity and thereby provides substantially constant tension in the optical fiber during winding.

A sensor 25 senses the vertical position of the second pulley. In the preferred embodiment, the sensor is a linear position sensor (part no. TTS-RBU0195ACOB, Temposonics). The vertical position of the second pulley 22 is used to determine the difference between the speed at which the optical fiber is being supplied by the supplying device 11 and the speed at which the optical fiber is being wound on a spool. The vertical position of the second pulley 22 is also used to detect a break in the optical fiber, since the second pulley 22 will drop to the bottom of its run on the tensioning device 20 when the optical fiber breaks.

A moving mechanism 26, preferably a rodless air cylinder, is provided to move the second pulley 22 relative to the first and third pulleys 21 and 23 and into a threading position (FIG. 3) for a threading operation that will be described later.

The tensioning device 20 includes driving devices 27, 28, and 29 (FIG. 12) that drive the first, second, and third pulleys 21, 22, and 23, respectively, at a speed (i.e., a tangential velocity on the surface of the pulley contacting the optical fiber) that is substantially the same as the speed of the optical fiber while threading the optical fiber on the pulleys 21, 22, and 23 and while winding the optical fiber on the first and second spools 70 and 70'. Driving the pulleys 21, 22, and 23 prevents damage to the optical fiber during the threading operation and also provides better tension control during the winding operation. The driving devices 27, 28, and 29 are preferably electric motors, because their speed can be accurately controlled.

The distributor 40 distributes the optical fiber onto one of the first and second spools 70 and 70' during winding. The distributor 40 includes, in order along the fiber path, first and second distributor guiding members 41 and 42 that guide the optical fiber. In the preferred embodiment, the first and second distributor guiding members 41 and 42 are pulleys. The first pulley 41 is mounted on a pivot member 43, which is connected to a support member 60 of the distributor 40 so as to allow the first pulley 41 to pivot about an axis A2 (FIGS. 9 and 13). The second pulley 42 is non-pivotable and is maintained in an orientation substantially perpendicular to the rotational axes R1 and R2 of the first and second spools 70 and 70', as shown in FIG. 9.

As shown in FIG. 14, first and second moving mechanisms 44 and 45 are provided to move the first and second pulleys 41 and 42, respectively. The first moving mechanism 44 preferably includes a rodless air cylinder 46 that drives a mounting member 47, upon which the first pulley 41 is mounted, along rods 48. The air cylinder 46 moves the first pulley 41 from the winding position shown in FIG. 1 to the threading position shown in FIG. 3, for a threading operation that will be explained later. As shown in FIG. 14, the path of movement of the first pulley 41 is angled slightly relative to the path of movement of the second pulley 42, to allow the first pulley 41 to move past the second pulley 42 without the two pulleys coming into contact.

The second moving mechanism 45 preferably includes a standard air cylinder 49 that drives a mounting member 50, upon which the second pulley 42 is mounted, so that rods 51 fixed to the mounting member 50 slide through a base member 52. The air cylinder 49 moves the second pulley 42 between a position in which the second pulley 42 is disposed for threading the optical fiber onto the distributor 40 (FIG.

3) and for threading and winding the optical fiber onto the first spool 70 (FIG. 16C) and a position in which the second pulley 42 is disposed for threading and winding the optical fiber onto the second spool 70' (FIG. 15C), as will be explained later.

Driving devices 53 and 54 (FIGS. 13 and 14) drive the first and second pulleys 41 and 42 at a speed that is substantially the same as a speed of the optical fiber while threading the optical fiber on the first and second pulleys 41 and 42 and while winding the optical fiber on the first and second spools 70 and 70'. The driving devices 53 and 54 are preferably electric motors.

As shown in FIG. 9, a moving mechanism 58 moves the distributor 40 substantially parallel to the rotational axes R1 and R2 of the first and second spools 70 and 70' to position the distributor 40 for threading and to distribute the optical fiber during winding. In the preferred embodiment, the moving mechanism 58 includes a slide (part no. 506201 ET-LH-MP, Daedal Division of Parker Hannifin Corporation) having a table 62, a nut 59 that is mounted on the underside of the support member 60 of the distributor 40, and a lead screw 63 that is threaded through the nut 59. The moving mechanism 58 also includes a motor 61, which is mounted on the table 62 and rotates the lead screw 63 to force the nut 59 to move along the lead screw 63, thereby causing the support member 60 of the distributor 40 to slide along the table 62.

At high fiber speeds, such as thirty meters per second, the optical fiber will be damaged if it must slide across a surface, such as the side of a guide path (groove) of a pulley. If the third pulley 23 of the tensioning device 20 and the first pulley 41 of the distributor 40 were not pivotable, the movement of the distributor 40 in the direction parallel to the rotational axes R1 and R2 during winding would cause the third pulley 23 and the first pulley 41 to become offset or misaligned. Pulleys are considered misaligned when the optical fiber enters a groove of at least one of the pulleys at an angle relative to a line tangential to the apex of the groove at the point of initial contact between the optical fiber and the groove. This misalignment would force the moving optical fiber to slide across sides of the grooves of the third pulley 23 and the first pulley 41, thus damaging the optical fiber.

Accordingly, the third pulley 23 and the first pulley 41 are mounted so as to be pivotable, as described above, and the pivoting pulleys 23 and 41 are connected by a telescoping linkage 65 to maintain a predetermined alignment therebetween. The telescoping linkage 65 is connected to the pivot member 24 of the third pulley 23 (FIG. 12) and the pivot member 43 of the first pulley 41 (FIG. 13). As shown in FIG. 9, the telescoping linkage 65 connects the pivoting pulleys 23 and 41 so that they stay aligned throughout the movement of the distributor 40. With the pivoting pulleys 23 and 41 maintained in this predetermined alignment, the optical fiber, as it is moving between the pulleys 23 and 41, will not be forced to slide across the sides of the grooves of those pulleys.

However, pivoting the pulley 23 may cause it to become misaligned with the pulley 22, and pivoting the pulley 41 may cause it to become misaligned with the pulley 42. Thus, the pivoting movements of pulleys 23 and 41 may force the optical fiber, as it is moving between pulleys 22 and 23 and between pulleys 41 and 42, to slide across the sides of the grooves of those pulleys and become damaged.

Accordingly, the present invention has been designed to prevent such misalignment during pivoting. More particularly, as shown in FIGS. 1 and 12, the second pulley 22 and the third pulley 23 are initially placed in alignment by having each of their grooves disposed substantially on a first line (axis A1). Specifically, the groove of the third pulley 23 is disposed directly on the first line, and the groove of the second pulley 22 is offset about ⅜ of an inch from the first line (this offset allows the second pulley 22 to move vertically past the third pulley 23 without the two pulleys coming into contact). The present invention maintains this alignment by pivoting the third pulley 23 about axis A1, such that the groove of the third pulley 23 remains on the first line during pivoting. Similarly, as shown in FIGS. 1 and 13, to enable the first pulley 41 of the distributor 40 to pivot without damaging the optical fiber, the first pulley 41 and the second pulley 42 are arranged to each have their groove disposed substantially on a second line (axis A2), and the first pulley 41 is pivoted about axis A2.

The first and second spindle assemblies 68 and 68' rotate the first and second spools 70 and 70', respectively, for threading and winding. The first and second spindle assemblies 68 and 68' are substantially the same, except the second spindle assembly 68' is inverted relative to the first spindle assembly 68. Accordingly, only the first spindle assembly 68 will be described in detail.

Figure 18:
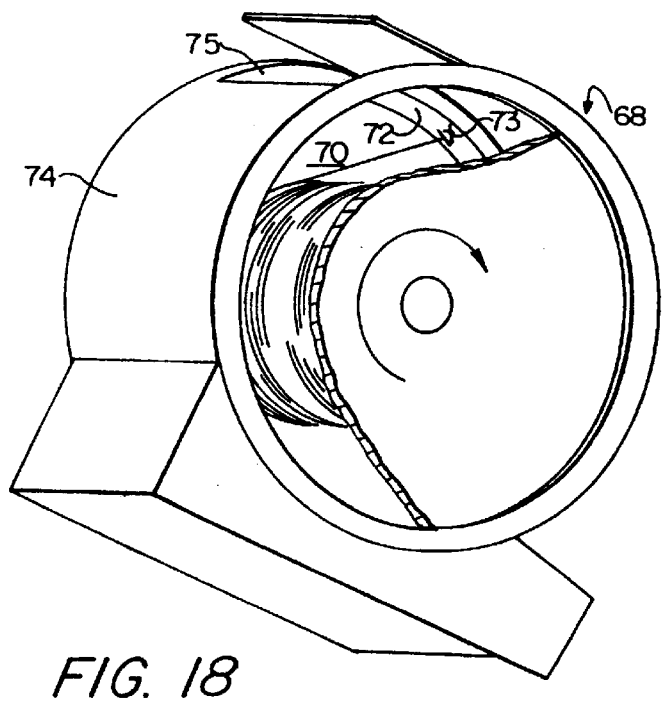
FIG. 18 is a perspective view of a spindle assembly in the winding apparatus of FIG. 1.

The first spindle assembly includes a first spindle (only partially shown) that supports the first spool 70 such that they are joined for rotation. The first spindle is driven by a motor 71 (FIG. 19) to rotate the first spool 70. As shown in FIG. 18, the first spindle has a flange 72, adjacent to the first spool 70. A first threading device 73 is mounted on the flange 72. In the preferred embodiment, the first threading device 73 is a snag tooth.

A housing 74 surrounds substantially the entire first spool 70 to provide whip protection and to provide operator safety. The housing 74 has a winding slot 75 extending substantially parallel to a rotational axis R1 of the first spool 70. The optical fiber from the distributor 40 is wound onto the first spool 70 through the winding slot 75. The housing 74 also has a threading slot 76 that extends in a plane transverse to the rotational axis R1 of the first spool 70. The threading slot 76 includes a snagging portion 76A that extends substantially parallel to the rotational axis R1 of the first spool 70. The threading slot 76 is used in the threading operation, which will be described later.

The Threading Components

The collecting device 80 preferably includes an aspirator 82 (model no. HS-18, Enka-Tecnica) that collects the optical fiber from the supplying device 11. The aspirator 82 is powered by compressed air delivered at a variable pressure ranging from 0 to 180 pounds per square inch, based on the speed at which the optical fiber is being supplied by the supplying device 11, to suck in the optical fiber and to provide a tension of preferably about 40 grams in the optical fiber moving between the supplying device 11 and the aspirator 82. The collecting device 80 has a frame 84 supporting the aspirator 82 that is connected to a collection hose 82A. A photoelectric sensor 81, which is disposed in the collection hose 82A about six feet from the entrance of the aspirator 82, detects when the optical fiber is being collected.

Figure 17A:
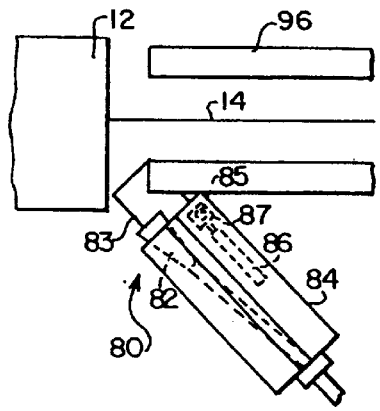
FIGS. 17A–17D are plan views showing the engagement of the optical fiber by the engaging portion of the positioning device in the winding apparatus of FIG. 1.
Figure 17B:
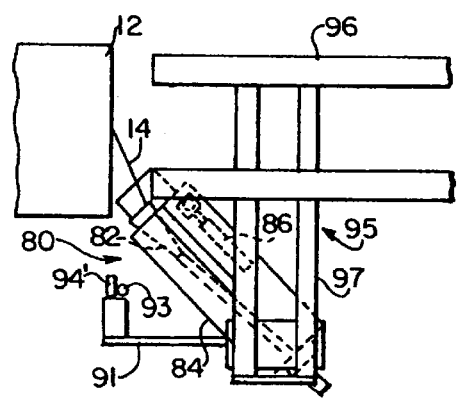

The aspirator 82 is located in the vicinity of the belted capstan 12 of the supplying device 11. A moving mechanism 83, preferably a rodless air cylinder, is provided to move the aspirator 82 relative to the belted capstan 12 to the retracted and extended positions shown in FIGS. 17A and 17B, respectively. Extending the aspirator 82 toward the belted capstan 12 places the aspirator 82 near the anticipated path of the optical fiber emerging from the belted capstan 12 and, thus, at a position that ensures that the aspirator 82 will automatically collect the optical fiber when a break occurs.

A guiding member 85, preferably a roller, is provided adjacent to the aspirator 82 and within the frame 84. The roller 85 provides a rolling surface that guides the optical fiber moving between the aspirator 82 and the positioning device 90 such that the optical fiber enters the aspirator 82 without dragging across a fixed surface. A moving mechanism 86, preferably an air cylinder, is provided to move the roller 85 relative to the aspirator 82 to the retracted and extended positions shown in FIGS. 17A and 17C, respectively. A driving device 87, preferably an electric motor, drives the roller 85 at a speed that is substantially the same as a speed of the optical fiber.

The positioning device 90 takes the optical fiber moving between the supplying device 11 and the aspirator 82 and moves it to various threading positions. The positioning device 90 includes a thread arm 91 with an engaging portion 92 disposed thereon.

The engaging portion 92 is capable of engaging the optical fiber to guide it, while allowing the optical fiber to be continuously collected by the aspirator 82. The engaging portion 92 includes a primary idler roller 93 and two secondary idler rollers 94 and 94' disposed substantially perpendicularly to the roller 93 (FIG. 10). The roller 93 engages and guides the optical fiber when it is being moved back toward the first and second spools 70 and 70', and the rollers 94 and 94' engage and guide the optical fiber when it is being threaded on the first and second spools 70 and 70', respectively, as will be explained later in connection with the threading operations.

A moving mechanism 95 moves the thread arm 91, and thus the engaging portion 92, in a first direction toward the first and second spools 70 and 70' and in a second direction transverse to the first direction, as shown in FIG. 4. The moving mechanism 95 includes a longitudinal track 96 and a transverse track 97. The transverse track 97 is moved along the longitudinal track 96 in the first direction by a belt connected to the transverse track 97 and extending around an idler roller and a motor driven roller disposed at opposite ends of the longitudinal track 96 (not shown). The thread arm 91 is moved along the transverse track 97 in the second direction by a belt connected to the thread arm 91 and extending around an idler roller and a motor driven roller disposed at opposite ends of the transverse track 97 (not shown).

The first and second fiber guiding devices 100 and 100' guide the optical fiber into position for threading onto the first and second spools 70 and 70', respectively. The first and second fiber guiding devices 100 and 100' are substantially the same, except the second fiber guiding device 100' is inverted relative to the first fiber guiding device 100. Accordingly, only the first fiber guiding device 100 will be described in detail.

As shown in FIG. 11, the first fiber guiding device 100 preferably includes a pulley 101 rotatably mounted on a support component 102, which is movably mounted on a base member 103. A driving device 107, preferably an electric motor, drives the pulley 101 at a speed that is substantially the same as a speed of the optical fiber.

A moving mechanism 104 includes an air cylinder 105 that moves the pulley 101 substantially parallel to the rotational axis R1 of the first spool 70. The air cylinder 105 moves the pulley 101 to the retracted and extended positions shown in FIGS. 6 and 8, respectively.

The moving mechanism 104 also moves the pulley 101 along a substantially arcuate path extending in a plane transverse to the rotational axis R1 of the first spool 70. The moving mechanism 104 includes a substantially arcuate track 106 along which the base member 103 is moved by a belt connected to the base member 103 and extending around an idler roller and a motor driven roller disposed at opposite ends of the track 106 (not shown). As will be explained in connection with the threading operations, moving the pulley 101 along this arcuate path causes it to engage the optical fiber in a threading position and move the optical fiber toward the rotational axis R1 for threading the optical fiber onto the first spool 70.

The Threading Operations

One threading operation involves taking optical fiber that is being collected by the aspirator 82 and threading it onto the winding apparatus 10. The aspirator 82 collects the optical fiber in at least two situations, namely, at the beginning of a draw and when the optical fiber breaks during a draw.

At the beginning of a draw, an operator uses a relatively small vacuum cleaner to collect the optical fiber emerging from the belted capstan 12. When the speed of the optical fiber emerging from the belted capstan 12 exceeds seven meters per second, the aspirator 82 is activated (compressed air is provided) and the operator breaks the optical fiber and almost simultaneously inserts it into the aspirator 82, which begins collecting the optical fiber.

When the optical fiber breaks during a draw, the second pulley 22 of the tensioning device 20 drops to the bottom of its run on the tensioning device 20, and the break is automatically detected. The aspirator 82 is then automatically activated and moved toward the belted capstan 12 of the supplying device 11 (FIG. 17B) by the air cylinder 83 to begin collecting the optical fiber.

In both situations, once the optical fiber is being collected by the aspirator 82, the threading operation proceeds automatically as described below.

When the sensor 81 in the collection hose 82A detects that optical fiber is being collected, the distributor 40 moves to a first position for threading shown in FIG. 2, and the air cylinders 26 and 46 move the second pulley 22 of the tensioning device 20 and the first pulley 41 of the distributor 40, respectively, to their threading positions shown in FIG. 3. The motors 27, 28, 29, 53, and 54 begin rotating the pulleys 21, 22, 23, 41, and 42 at the same speed as the optical fiber (the speed of the optical fiber is determined based on the speed of the belted capstan 12). One of the spindles 68 and 68' also begins rotating the corresponding one of the first and second spools 70 and 70' at a speed 0.2 meters per second faster than the speed of fiber being supplied by the supplying device 11.

Figure 17C:
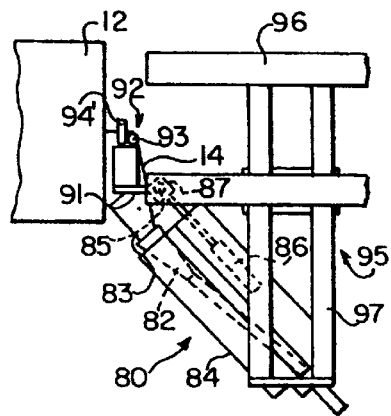
Figure 17D:
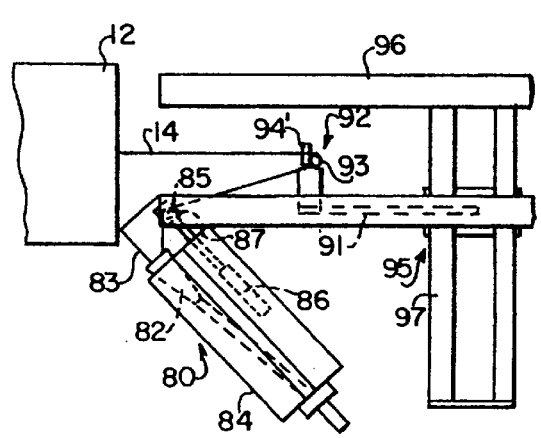

The aspirator 82 is then moved away from the belted capstan 12 by the air cylinder 83 to the retracted position shown in FIG. 17C. The engaging portion 92 of the positioning device 90 is simultaneously moved inward by the moving mechanism 95 from the position shown in FIG. 17B to the position shown in FIG. 17C. As a consequence, the roller 93 engages the optical fiber moving between the belted capstan 12 and the aspirator 82, as shown in FIG. 17C. The optical fiber extends between, but does not engage, the rollers 94 and 94'.

The roller 85, which is being rotated at the speed of the optical fiber by the motor 87, is then moved to its extended position (FIG. 17C) by the air cylinder 86 to engage and guide the optical fiber moving between the roller 93 and the aspirator 82.

As shown in FIG. 4, the moving mechanism 95 moves the engaging portion 92 from position A, where it engages the optical fiber, to an outward position B by moving in the first direction toward the first and second spools 70 and 70' and then moving in the second direction transverse to the first direction. Once at the outward position B, the engaging portion 92 can continue to move in the first direction without contacting the spindle assemblies 68 and 68'. After the engaging portion 92 has passed the spindle assemblies 68 and 68', it is moved in the direction opposite to the second direction to a position C (a first position of the engaging portion) to dispose the optical fiber in the first threading position, where it continues to be supplied by the supplying device 11, guided by the roller 93 and the roller 85, and collected by the aspirator 82.

The optical fiber in the first threading position is spaced substantially equidistantly from the first and second spools 70 and 70' (FIG. 3), is disposed substantially in the middle of each of the spools (FIG. 4), and extends substantially perpendicularly to a line extending between the rotational axes R1 and R2 of the spools. As shown in FIG. 3, the optical fiber in the first threading position extends between the second pulley 22, which is in its threading position, and the first and third pulleys 21 and 23 of the tensioning device 20. The optical fiber also extends between the first pulley 41, which is in its threading position, and the second pulley 42 of the distributor 40.

Figure 5:
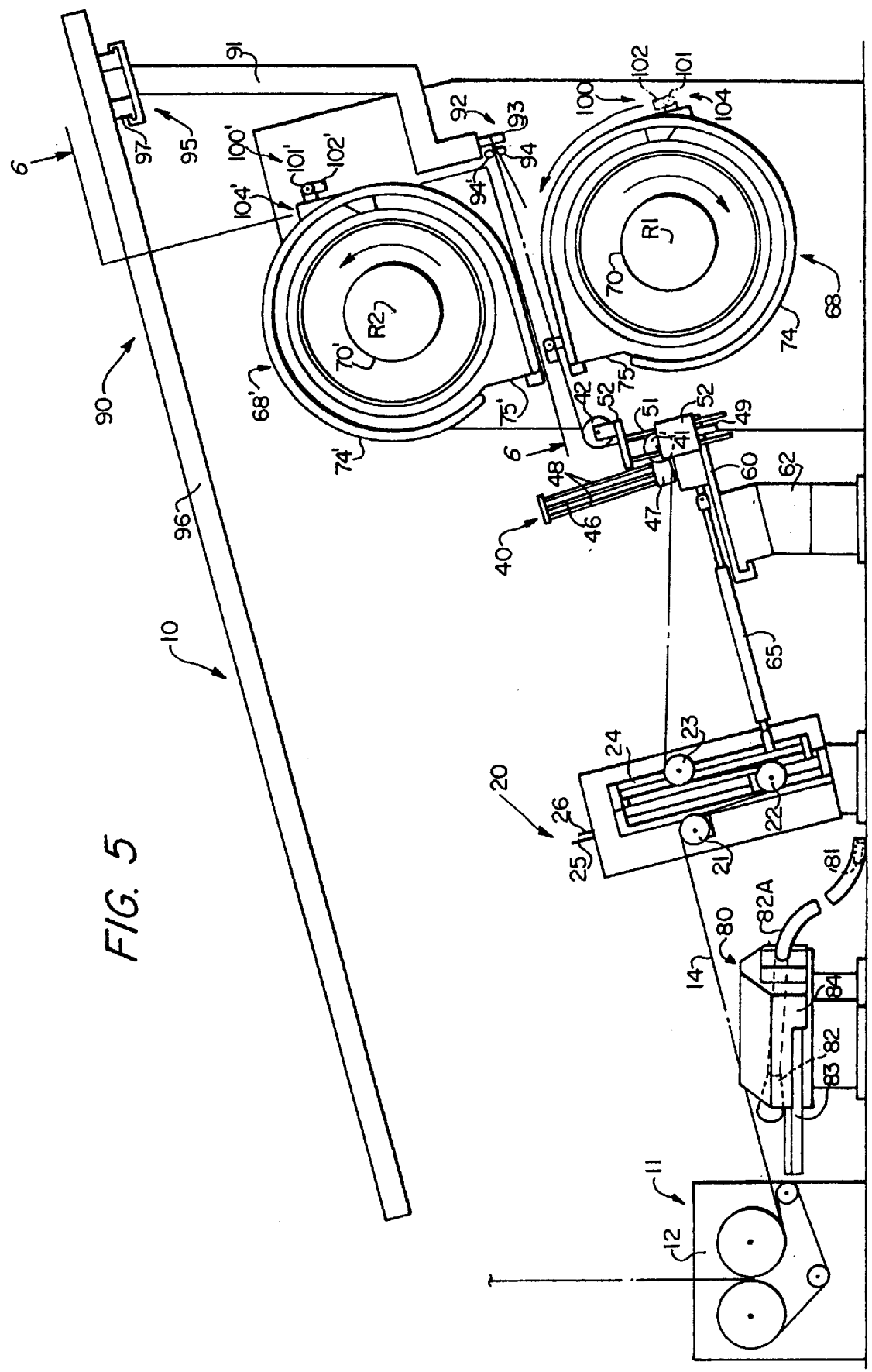
FIG. 5 is a side view of the winding apparatus of FIG. 1, showing the optical fiber in a second threading position.

The air cylinder 26 then allows the second pulley 22 of the tensioning device 20 to drop down to its winding position shown in FIG. 5, which causes the second pulley 22 to engage the optical fiber and pull it down onto the first and third pulleys 21 and 23, consequently threading the optical fiber onto the tensioning device 20. Also, the air cylinder 46 moves the first pulley 41 of the distributor 40 down to its winding position shown in FIG. 5, which causes the first pulley 41 to engage the optical fiber and pull it down onto the second pulley 42, consequently threading the distributor 40.

The engaging portion 92 and the distributor 40 are then moved from respective first positions (FIG. 4) to respective second positions (FIG. 6), in which the optical fiber is in a second threading position for threading onto one of the first and second spools 70 and 70'.

The circumstances determine the particular spool on which the optical fiber will be threaded. For example, if the optical fiber breaks while winding on the first spool 70, it will be threaded onto the empty second spool 70', and the partially-wound first spool 70 will subsequently be removed.

Since the threading operation is the same for both the first and second spools 70 and 70', it will be described only in conjunction with the first spool 70.

As the optical fiber is moved to the second threading position, the moving mechanism 104 begins moving the first fiber guiding device 100 upward along the arcuate track 106 in the direction shown in FIG. 5. While the first fiber guiding device 100 is moved upward along the arcuate track 106, the motor 107 begins rotating the pulley 101 at the same speed as the optical fiber, and the pulley 101 is maintained in the retracted position by the air cylinder 105 so that the pulley 101 cannot engage the optical fiber. When the pulley 101 reaches the position shown in FIG. 6, the air cylinder 105 moves the pulley 101 parallel to the rotational axis R1 of the first spool 70 to the extended position shown in FIG. 8, at which the pulley 101 is capable of engaging the optical fiber. The pulley 101 is thus disposed on a side of the optical fiber away from the first spool 70, as shown in FIG. 5.

The moving mechanism 104 moves the rotating pulley 101 back along the arcuate track 106, as shown in FIG. 7, to engage the optical fiber in the second threading position and pull it down toward the rotational axis R1 of the first spool 70. As the pulley 101 pulls the optical fiber downward, the optical fiber slides off the roller 93 of the engaging portion 92 and onto the roller 94. As the pulley 101 continues to move along the arcuate track 106, it guides the optical fiber into the threading slot 76, as shown in FIG. 19, until the optical fiber is disposed substantially tangential to a barrel of the first spool 70 and is slightly wrapped around the barrel of the first spool 70, as shown in FIG. 7.

Figure 19:
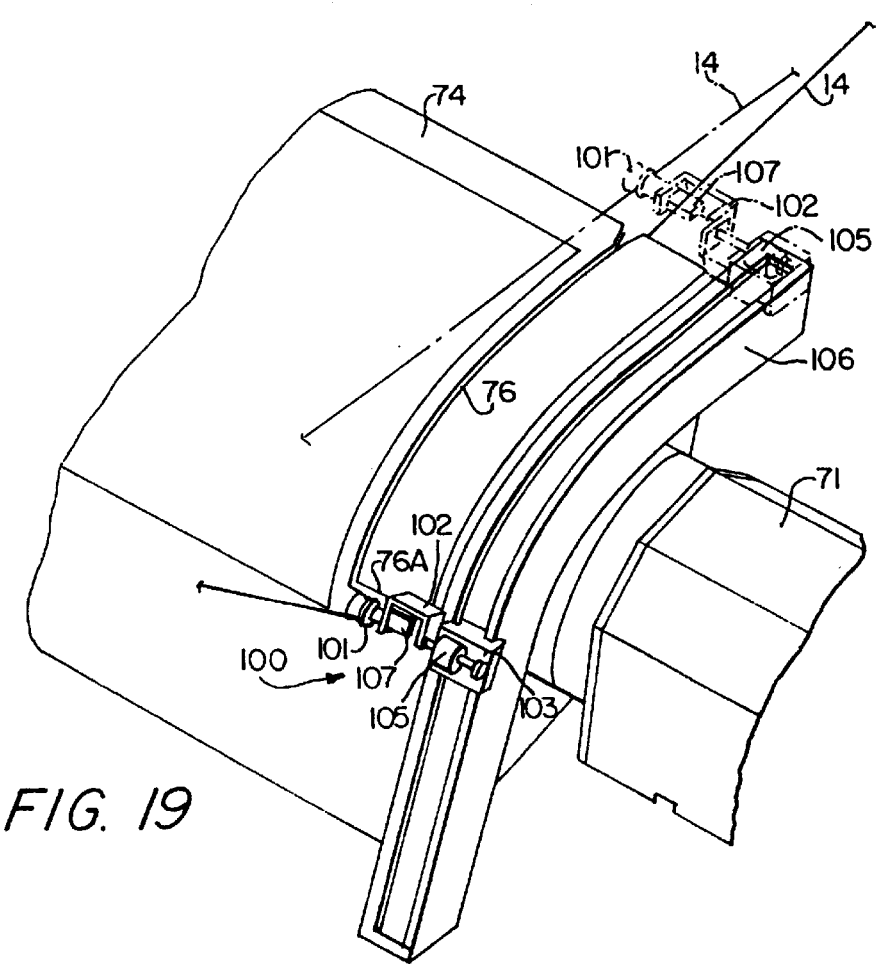
FIG. 19 is a perspective view of the fiber guiding device and the spindle assembly in the winding apparatus of FIG. 1.

As shown in FIG. 19, the air cylinder 105 then moves the pulley 101 substantially parallel to the rotational axis R1 of the first spool 70 to its retracted position. This movement pulls the optical fiber into the snagging portion 76A of the threading slot 76 and near the flange 72 of the rotating spindle, which allows the snag tooth 73 (FIG. 18) to take the optical fiber by simultaneously gripping the optical fiber and cutting it.

The gripped portion of the optical fiber is threaded onto the barrel of the first spool 70, which is moving at a speed that is 0.2 meters per second faster than the speed of the optical fiber. This speed overdrive causes the pulley 22 of the tensioning device 20 (FIG. 1) to rise into a control zone when the optical fiber is threaded onto the first spool 70. The speed at which the optical fiber is pulled by the first spool 70 is determined by the speed of the barrel of the first spool 70 and not by the speed of the snag tooth 73, which is disposed outwardly of the barrel of the first spool 70 and thus is moving faster. Therefore, the first spool 70 is threaded without unduly jerking the optical fiber.

The cut or loose portion of the optical fiber is sucked into the aspirator 82, and the winding operation proceeds automatically.

Another threading operation involves taking the optical fiber that is being wound on one spool and transferring it to the other spool. This may be desirable, for example, when optical fiber has been wound on the one spool to a desired extent, such as when the one spool is full. The winding apparatus 10 can determine how much optical fiber has been wound on a spool by monitoring the revolutions of the belted capstan 12.

When the optical fiber has been wound on the second spool 70' to a desired extent, the moving mechanism 58 moves the distributor 40 parallel to the rotational axis R2 of the second spool 70' to the position shown in FIG. 6, while the second spool 70' continues to wind the optical fiber. The air cylinder 49 then moves the second pulley 42 of the distributor 40 from the threading and winding position for the second spool 70' (FIG. 16A) to the threading and winding position for the first spool 70 (FIG. 16B), to dispose the optical fiber in a first spool transfer position. The optical fiber in the first spool transfer position is disposed such that it can be engaged by the pulley 101 of the first fiber guiding device 100.

As the optical fiber is moved to the first spool transfer position, the moving mechanism 104 begins moving the first fiber guiding device 100 upward along the arcuate track 106. While the first fiber guiding device 100 is moved upward along the arcuate track 106, the motor 107 (FIG. 11) begins rotating the pulley 101 at the same speed as the optical fiber, and the pulley 101 is maintained in the retracted position by the air cylinder 105 so that the pulley 101 cannot engage the optical fiber. When the pulley 101 reaches the position shown in FIG. 16B, the air cylinder 105 moves the pulley 101 parallel to the rotational axis R1 of the first spool 70 to its extended position, at which the pulley 101 is capable of engaging the optical fiber. The pulley 101 is thus disposed on a side of the optical fiber away from the first spool 70.

The moving mechanism 104 moves the rotating pulley 101 back along the arcuate track 106, to engage the optical fiber in the first spool transfer position and pull it down toward the rotational axis R1 of the first spool 70, as shown in FIG. 16C. As the pulley 101 moves along the arcuate track 106, it guides the optical fiber into the threading slot 76, as shown in FIG. 19.

As also shown in FIG. 19, the air cylinder 105 then moves the pulley 101 substantially parallel to the rotational axis R1 of the first spool 70 to its retracted position. This movement pulls the optical fiber into the snagging portion 76A of the threading slot 76 and near the flange 72 of the rotating spindle, which allows the snag tooth 73 (FIG. 18) to take the optical fiber by simultaneously gripping the optical fiber and cutting it. The cut portion of the optical fiber is wound onto the second spool 70'. The gripped portion of the optical fiber is threaded onto the spool 70, and the winding operation proceeds automatically.

Similarly, when the optical fiber has been wound on the first spool 70 to a desired extent, the moving mechanism 58 moves the distributor 40 parallel to the rotational axis R1 of the first spool 70 to the position shown in FIG. 6, while the first spool 70 continues to wind the optical fiber. The air cylinder 49 then moves the second pulley 42 of the distributor 40 from a threading and winding position for the first spool 70 (FIG. 15A) to a threading and winding position for the second spool 70' (FIG. 15B), to dispose the optical fiber in a second spool transfer position. The optical fiber in the second spool transfer position is disposed such that it can be engaged by the pulley 101', which is rotatably mounted on a support component 102' of the second fiber guiding device 100', as the pulley 101' is moved by a moving mechanism 104'. Although the second fiber guiding device 100' is inverted relative to the first fiber guiding device 100, it works in the same way to thread the optical fiber at the second spool transfer position onto the second spool 70', as shown in FIGS. 15B and 15C.

Figure 20:
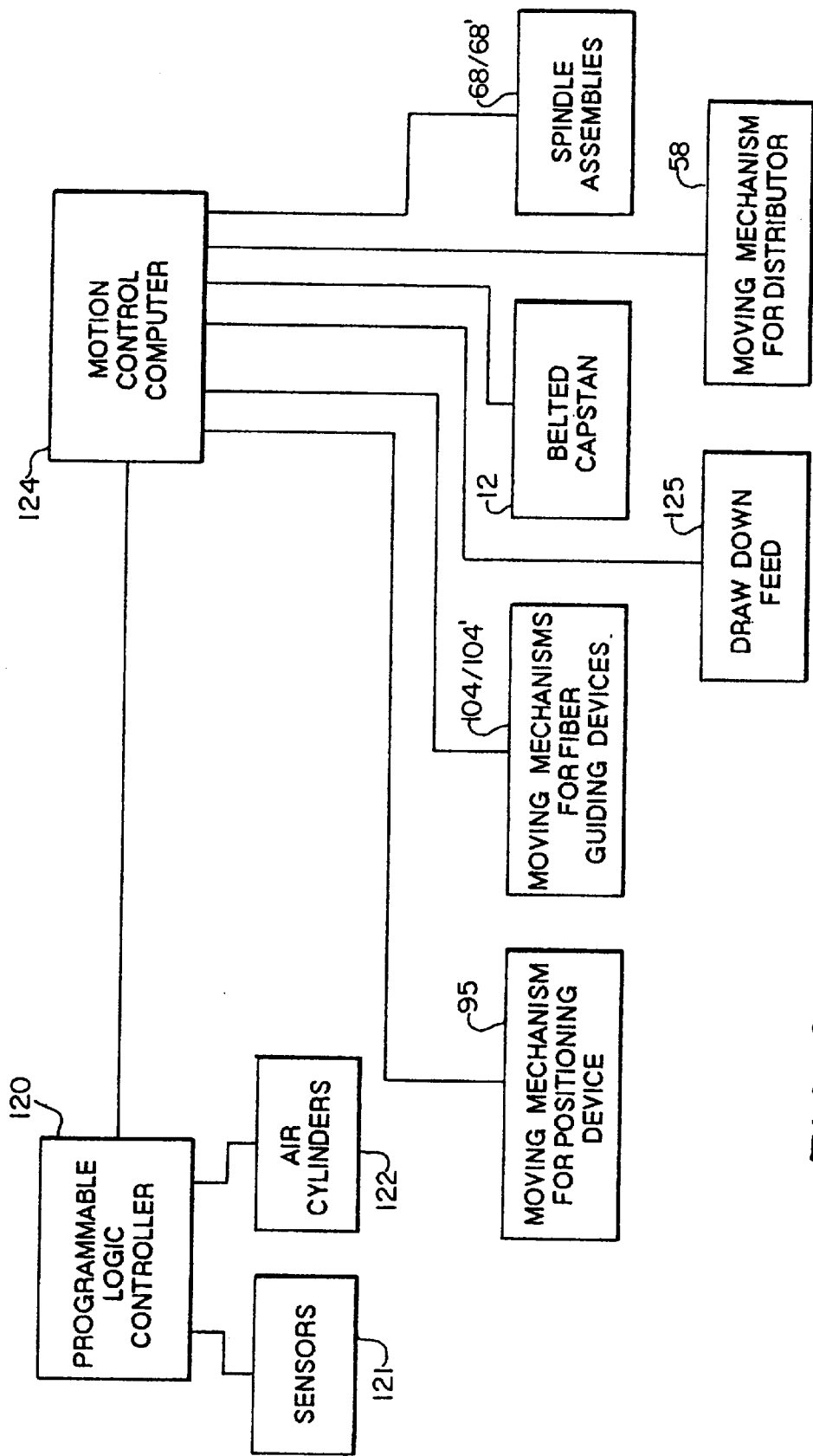
FIG. 20 is a schematic diagram of a control system for the winding apparatus of FIG. 1.

A control system for controlling the winding apparatus 10 to perform the above-mentioned threading and winding operations is shown in FIG. 20. The control system includes a programmable logic controller 120, which controls the sequence of events, monitors all of the sensors 121 (such as sensors 25 and 81), controls all of the air cylinders 122 (such as air cylinders 26, 46, and 49), and communicates with a motion control computer 124. The motion control computer 124 controls and monitors the moving mechanism 95 for the positioning device 90, the moving mechanisms 104 and 104' for the first and second fiber guiding devices 100 and 100', the draw downfeed 125, the belted capstan 12, the moving mechanism 58 for the distributor 40, and the first and second spindle assemblies 68 and 68'.

It will be apparent to those skilled in the art that various modifications and variations can be made in the method and apparatus of the present invention without departing from the scope or spirit of the invention. For example, although a preferred embodiment has been described with reference to the winding of optical fibers, certain aspects of the invention may be applied to the winding of fibers of other suitable materials.

Other embodiments of invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of positioning, for threading, a broken optical fiber, which is being continuously supplied by an optical fiber supplying device for winding on a spool, the method comprising the steps of:

collecting a moving supply of optical fiber with a collecting device by urging the fiber from the supplying device into the collecting device to provide a tension in the fiber between the supplying device and the collecting device;

engaging the fiber between the supplying device and the collecting device with a positioning device having an engaging portion that engages the fiber while allowing the fiber to be continuously fed into and collected in the collecting device; and moving the engaging portion to move the fiber to at least one threading position.

2. The method of claim 1, wherein the supplying device in said collecting step is a fiber draw process.

3. The method of claim 2, further comprising supplying optical fiber from said fiber draw process at a speed at least 30 meters per second.

4. The method of claim 1, further comprising detecting a break in said fiber, wherein the step of collecting the fiber includes moving the collecting device from a retracted position toward a path of the broken fiber when said break in the fiber is detected.

5. The method of claim 1, further comprising detecting a break in said fiber, wherein the step of collecting the fiber includes activating the collecting device when said break in the fiber is detected.

6. The method of claim 1, wherein the step of collecting the fiber includes detecting the presence of fiber in the collecting device.

7. The method of claim 1, further comprising the step of guiding the fiber between the collecting device and the positioning device with a guiding member.

8. The method of claim 7, further comprising the step of driving the guiding member, with a driving device, at a speed that is substantially the same as a speed of the fiber.

9. The method of claim 7, further comprising the step of moving the guiding member relative to the collecting device.

10. The method of claim 1, wherein the step of moving the engaging portion includes moving the engaging portion in a first direction toward the spool and a second direction transverse to said first direction.

11. The method of claim 1, wherein the engaging portion moves the fiber to a first threading position, and further comprising the step of threading the fiber in the first threading position onto a tensioning device that tensions the fiber to be wound on the spool.

12. The method of claim 11, wherein the step of threading the fiber onto the tensioning device includes moving guiding members of the tensioning device from a winding position to a position in which the fiber in the first threading position is disposed between the guiding members, and returning the guiding members to the winding position.

13. The method of claim 12, wherein the step of threading the fiber onto the tensioning device includes driving the guiding members, with driving devices, at a speed that is substantially the same as a speed of the fiber while threading the fiber on the guiding members.

14. The method of claim 13, further comprising the steps of threading the fiber on the spool, winding the fiber on the spool, and driving the guiding members, with the driving devices, at a speed that is substantially the same as a speed of the fiber while winding the fiber on the spool.

15. The method of claim 12, further comprising the steps of threading the fiber on the spool, winding the fiber on the spool, and detecting a position of one of the guiding members to determine a difference between a speed at which the fiber is being supplied by the supplying device and a speed at which the fiber is being wound on the spool and to detect when the fiber has broken.

16. The method of claim 1, wherein the engaging portion moves the fiber to a first threading position, and further comprising the step of threading the fiber in the first threading position onto a distributor that distributes the fiber to be wound on the spool.

17. The method of claim 16, wherein the step of threading the fiber onto the distributor includes moving first and second distributor guiding members from a winding position to a position in which the fiber in the first threading position is disposed between the first and second distributor guiding members, and returning the first and second distributor guiding members to the winding position.

18. The method of claim 17, wherein the step of threading the fiber onto the distributor includes driving the first and second distributor guiding members, with driving devices, at a speed that is substantially the same as a speed of the fiber while threading the fiber on the first and second distributor guiding members.

19. The method of claim 18, further comprising the steps of threading the fiber on the spool, winding the fiber on the spool, and driving the first and second distributor guiding members, with the driving devices, at a speed that is substantially the same as a speed of the fiber while winding the fiber on the spool.

20. The method of claim 16, further comprising the steps of moving the engaging portion of the positioning device and the distributor from respective first positions, in which the engaging portion maintains the fiber in the first threading position and the distributor is disposed for threading, to respective second positions, in which the engaging portion and distributor maintain the fiber in a second threading position for threading the fiber onto the spool.

21. The method of claim 20, further comprising the step of threading the fiber in the second threading position onto the spool by moving a fiber guiding device to engage the fiber at the second threading position and to move the fiber to thread the fiber onto the spool.

22. The method of claim 21, wherein the step of threading the fiber onto the spool includes moving the fiber guiding device to move the fiber toward a rotational axis of the spool, and taking the fiber from the fiber guiding device with a threading device that threads the fiber on the spool.

23. The method of claim 22, wherein the fiber guiding device is moved along a substantially arcuate path.

24. The method of claim 22, wherein the step of threading fiber onto the spool includes moving the fiber guiding device substantially parallel to the rotational axis of the spool to allow the threading device to take the fiber.

25. The method of claim 21, wherein the step of threading fiber onto the spool includes driving the fiber guiding device, with a driving device, at a speed that is substantially the same as a speed of the fiber.

26. The method of claim 1, further comprising the steps of:

threading the fiber onto a tensioning device that tensions the fiber to be wound on the spool and that has a non-pivotable guiding member and a pivotable guiding member;

threading the fiber onto a distributor that distributes the fiber to be wound on the spool and that has a first distributor guiding member and a second distributor guiding member;

guiding the fiber with the non-pivotable guiding member by disposing the fiber in a guide path of the non-pivotable guiding member disposed substantially on a first line;

guiding the fiber with the pivotable guiding member by disposing the fiber in a guide path of the pivotable guiding member disposed substantially on the first line;

changing a direction of feeding of the fiber by pivoting the pivotable guiding member about an axis that is defined by the first line;

guiding the fiber from the pivotable guiding member with the first distributor guiding member by disposing the fiber in a guide path of the first distributor guiding member disposed substantially on a second line;

guiding the fiber onto the spool with the second distributor guiding member by disposing the fiber in a guide path of the second distributor guiding member disposed substantially on the second line;

moving the distributor substantially parallel to a rotational axis of the spool to distribute fiber on the spool; and pivoting the first distributor guiding member about an axis that is defined by the second line as the distributor moves to distribute fiber.

27. The method of claim 26, further comprising the step of maintaining a predetermined alignment between the pivotable guiding member and the first distributor guiding member.

28. A method of positioning, for threading, a broken optical fiber, which is being continuously supplied by an optical fiber supplying device for winding on one of a first and second spool, the method comprising the steps of:

collecting a moving supply of optical fiber with a collecting device by urging the fiber from the supplying device into the collecting device to provide a tension in the fiber between the supplying device and the collecting device;

engaging the fiber between the supplying device and the collecting device with a positioning device having an engaging portion that engages the fiber while allowing the fiber to be continuously fed into and collected in the collecting device;

moving the engaging portion to move the fiber to at least one threading position; and threading the fiber onto one of the first and second spool.

29. The method of claim 28, wherein the engaging portion moves the fiber to a first threading position between the first and second spools.

30. The method of claim 29, wherein the fiber in the first threading position extends substantially perpendicularly to a line extending between a rotational axis of the first spool and a rotational axis of the second spool.

31. The method of claim 34, further comprising the steps of:

threading the fiber in the first threading position onto a distributor that distributes the fiber to be wound onto one of the first and second spools; and moving the engaging portion of the positioning device and the distributor from respective first positions, in which the engaging portion maintains the fiber in the first threading position and the distributor is disposed for threading, to respective second positions, in which the engaging portion and distributor maintain the fiber in a second threading position for threading the fiber onto one of the first and second spools.

32. The method of claim 31, further comprising the steps of:

when the fiber is being wound on the second spool before breaking, threading the fiber onto the first spool by disposing a first fiber guiding device on a side of fiber, at the second threading position, away from the first spool, moving the first fiber guiding device to engage the fiber and move the fiber toward a rotational axis of the first spool, and taking the fiber from the first fiber guiding device with a first threading device that threads the fiber on the first spool; and when the fiber was being wound on the first spool before breaking, threading the fiber onto the second spool by disposing a second fiber guiding device on a side of the fiber, at the second threading position, away from the second spool, moving the second fiber guiding device to engage the fiber and move the fiber toward a rotational axis of the second spool, and taking the fiber from the second fiber guiding device with a second threading device that threads the fiber on the second spool.

33. The method of claim 31, further comprising the steps of:

when the fiber is being wound on the second spool and has been wound to a desired extent, transferring the fiber onto the first spool by moving the distributor to dispose the fiber in a first spool transfer position, disposing a first fiber guiding device on a side of the fiber, at the first spool transfer position, away from the first spool, moving the first fiber guiding device to engage the fiber and move the fiber toward the rotational axis of the first spool, and taking the fiber from the first fiber guiding device with a first threading device that threads the fiber on the first spool; and when the fiber is being wound on the first spool and has been wound to a desired extent, transferring the fiber onto the second spool by moving the distributor to dispose the fiber in a second spool transfer position, disposing a second fiber guiding device on a side of the fiber, at the second spool transfer position, away from the second spool, moving the second fiber guiding device to engage the fiber and move the fiber toward the rotational axis of the second spool, and taking the fiber from the second fiber guiding device with a second threading device that threads the fiber on the second spool.

* * * * *

UNITED STATES PATENT AND TRADEMARK OFFICE
CERTIFICATE OF CORRECTION

PATENT NO.    : 6,027,062
DATED         : February 22, 2000
INVENTOR(S)   : Christopher J. Bacon, Kirk P. Bumgarner, Paul A. Chludzinski, Duane E. Hoke It is certified that error appears in the above-identified patent and that said Letters Patent is hereby corrected as shown below:

<u>Column 14,</u>
Line 60, "The method of claim 34" should read -- The method of claim 28 --

Signed and Sealed this

Twenty-third Day of October, 2001

Attest:

*Nicholas P. Godici*

NICHOLAS P. GODICI
*Attesting Officer*    *Acting Director of the United States Patent and Trademark Office*